(12) United States Patent
Lopez-Moreira

(10) Patent No.: US 10,917,453 B2
(45) Date of Patent: Feb. 9, 2021

(54) METHOD AND SYSTEM FOR ASSESSING THE QUALITY OF A VIDEO TRANSMISSION OVER A NETWORK

(71) Applicant: Unify Patente GmbH & Co. KG, Munich (DE)

(72) Inventor: Alexandre Lopez-Moreira, Curitiba (BR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/431,892

(22) Filed: Jun. 5, 2019

(65) Prior Publication Data

US 2020/0007603 A1 Jan. 2, 2020

(30) Foreign Application Priority Data

Jun. 28, 2018 (EP) .................... 18180463

(51) Int. Cl.
*H04L 29/06* (2006.01)

(52) U.S. Cl.
CPC .......... *H04L 65/80* (2013.01); *H04L 65/4069* (2013.01)

(58) Field of Classification Search
CPC .... H04L 65/80; H04L 65/4069; H04N 17/004
See application file for complete search history.

(56) References Cited

U.S. PATENT DOCUMENTS

| | | | |
|---|---|---|---|
| 5,818,520 A | 10/1998 | Janko et al. | |
| 6,057,882 A | 5/2000 | van den Branden Lambrecht et al. | |
| 6,734,898 B2 | 5/2004 | Zeidler | |
| 7,085,401 B2 | 8/2006 | Averbuch et al. | |
| 2004/0156559 A1 | 8/2004 | Cheng et al. | |
| 2005/0276446 A1 | 12/2005 | Chen et al. | |
| 2006/0023067 A1* | 2/2006 | Yang | H04N 17/004 348/180 |

(Continued)

FOREIGN PATENT DOCUMENTS

| | | |
|---|---|---|
| EP | 0789497 B1 | 9/2001 |
| EP | 1926325 A2 | 5/2008 |
| EP | 1993221 B1 | 9/2010 |

OTHER PUBLICATIONS

European Search Report for EP18180463 dated Aug. 16, 2018.

*Primary Examiner* — Uzma Alam

(74) *Attorney, Agent, or Firm* — Buchanan Ingersoll & Rooney PC

(57) ABSTRACT

A method for assessing quality of a video transmission over a network between a transmitting side and a receiving side can include receiving, at the receiving side, a video stream generated at the transmitting side and transmitted via the network to the receiving side including a plurality of frames. At least one of the frames can include synthetically created portions. At the receiving side, the video stream received from the transmitting side can be analyzed by comparing the video stream received with the video stream originally transmitted. The receiving side can also generate and output a quality score for the video stream received. The output score can be based on the performed analysis. A system and communication apparatus configured to utilize an embodiment of the method are also provided.

19 Claims, 4 Drawing Sheets

(56) References Cited

U.S. PATENT DOCUMENTS

| | | | |
|---|---|---|---|
| 2007/0047542 A1* | 3/2007 | Thukral | H04L 43/0811 370/389 |
| 2008/0037864 A1 | 2/2008 | Zhang et al. | |
| 2008/0137968 A1 | 6/2008 | Joung et al. | |
| 2008/0198233 A1* | 8/2008 | Yang | H04N 17/004 348/181 |
| 2008/0263402 A1 | 10/2008 | Braysy | |
| 2009/0196247 A1* | 8/2009 | Fan | H04W 72/1268 370/329 |
| 2009/0208140 A1 | 8/2009 | Jayant et al. | |
| 2013/0293725 A1 | 11/2013 | Zhang et al. | |
| 2015/0082203 A1* | 3/2015 | James | G06F 3/0484 715/756 |
| 2015/0348251 A1* | 12/2015 | Wu | G06T 7/0002 348/701 |
| 2016/0225131 A1 | 8/2016 | Babbar | |
| 2018/0068195 A1* | 3/2018 | Kolarov | G06T 7/80 |

* cited by examiner

METHOD AND SYSTEM FOR ASSESSING THE QUALITY OF A VIDEO TRANSMISSION OVER A NETWORK

CROSS-REFERENCE TO RELATED APPLICATIONS

The present application claims priority to European Patent Application No. EP 18180463.4, filed on Jun. 28, 2018. The entirety of this application is incorporated by reference herein.

FIELD

The present invention relates to a method and a system for assessing the quality of a video transmission over a network.

BACKGROUND

Video is a common network application which today is widely used, for example, for video conferences or the like. However, there are still many challenges regarding video streaming. For example, video quality may change, in particular, may degrade from a transmitting source to a receiving side while a video stream passes through a video transmission and processing system resulting in distortion or other artifacts in the video signal.

For example, in prior art, it is known to transmit video streams using Ethernet. However, due to packet loss during transmission of the video data packets from a transmitter side to a receiver side, the representation of movements might degrade. For example, packet loss may either affect only a part of a frame being transmitted or even the entire frame. In the case in which a part of the frame is affected, then, the user will only also see, in the video sequence, part of that frame. In the case in which the entire frame is affected, then, this frame, at the receiver side, will simply not be displayed in the video sequence. Thus, the user perception will be that of a frozen image, depending on how severe the packet loss has been during transmission.

SUMMARY

Considering the above described situation, I have determined that evaluating and maintaining video quality is an issue. Namely, it is not sufficient to consider and evaluate only the quality of each frame which is received and presented in the video sequence to the user, but rather also the relation of the frames with respect to each other, since this relation actually creates the perception of movement being presented to the user or the person watching the video. Thus, first of all, the verification of video quality in consideration of the user's perception of movement is problematic in prior art applications.

Although the test comparison of two video files-by-frame, using a video reference and a video under test, is a simple test to be applied, and there are some applications that already implement it, such a test is usually carried out off-line, and the video to be tested has to be recorded for a later analysis (comparing the received video with the transmitted one). Considering this approach, however, it cannot be applied online "on-the-fly", i.e. testing cannot be carried out while a video stream is transmitted and received over a communications network, since the receiver usually does not have enough information about the transmitter in order to perform a simple task as frame synchronization that is a mandatory requirement for a frame-by-frame comparison.

Therefore, embodiments of the present invention can be based on the object to provide a method and system for assessing quality of a video transmission over a network which overcome the drawbacks from prior art discussed above. In particular, the present invention is based on the object to provide a method and system for assessing quality of a video transmission over a network which are able of testing the quality of transmission on the fly, i.e., online during the transmission of a video stream. This object can be solved according to embodiments of the present invention by a method for assessing quality of a video transmission over a network, a system for assessing quality of a video transmission over a network, and a communication apparatus that can be configured to utilize an embodiment of the method and/or be a included in an embodiment of the system or be an embodiment of the system.

In some embodiments, a method for assessing quality of a video transmission over a network between a transmitting side and a receiving side is provided that include the following steps:

receiving, at the receiving side, a video stream generated at the transmitting side and transmitted via the network to the receiving side, analyzing the video stream received from the transmitting side by comparing the video stream received by the receiving side with the video stream as transmitted at the transmitting side, the video stream as originally transmitted being known to the receiving side; and generating and outputting, at the receiving side, a quality score for the video stream received.

In embodiments of the method, the quality of a video stream transmission can be tested without the video having to be recorded first. Rather, it is possible to evaluate the quality of transmission "on the fly" during the ongoing online transmission of packets of the video stream. Namely, according to the inventive method, a reference video for testing is provided on the transmitting side rather than providing and comparing a reference video at the receiving side, thereby allowing for online quality assessment during the transmission. Moreover, the quality of the transmission of the video stream can be evaluated and predicted with respect to the Quality-of-Experience (QoE) of the person watching the video.

According to a preferred embodiment, the video stream comprises a plurality of frames, at least one frame of the plurality of frames comprising synthetically created portions, in particular, at least one frame of the plurality of frames comprising at least one moving portion and a static portion. According to another preferred embodiment, the at least one moving portion comprises a moving object, and the static portion comprises a static background, in particular, comprising a predefined image, which remains unchanged in each frame of the plurality of frames of the video stream. According to still another preferred embodiment, the at least one moving portion is created on the basis of a predefined rule, in particular, the at least one moving portion will change its position from frame to frame along the sequence of frames transmitted to the receiving side following a mathematical equation. For example, the moving portion or the moving object may follow a sinus function. Preferably, the synthetically created portions of the video stream are known at the receiving side, in particular, the mathematical equation according to which the at least one moving portion changes its position along the sequence of frames is known at the receiving side. Moreover, the at least one moving portion may be substantially smaller than the static portion or than the entire frame size. It can also be advantageous if the synthetically created portions of the video stream are generated, by the transmitting side, during transmission of the video stream.

Embodiments of the method can include other steps. For instance, the method may further comprise a step of preparing the video stream for being displayed at the receiving side. As another example, embodiments of the method can also comprise a step of displaying the video stream at the receiving side, and wherein the step of analyzing the video stream is carried out prior to the step of displaying the video stream.

Some embodiments of the method can be utilized so that the step of analyzing the video stream may be carried out after the step of preparing the video stream for being displayed. According to still another preferred embodiment, the input for the mathematical equation is the frame number of the at least one frame of the plurality of frames, and wherein the output of the mathematical equation is the horizontal and the vertical position of the moving object It can also be preferable to utilize embodiments of the method so that the video stream is receivable at the receiving side from the transmitting side via a media server. A media server can be a computer device having a processor connected to a non-transitory computer readable medium and at least one transceiver unit.

A system for assessing quality of a video transmission over a network between a transmitting side and a receiving side is also provided. Embodiments of the system can include a transmitting means and a receiving means connected to each other via a network and being adapted for carrying out an embodiment of the method. In some embodiments, the receiving means can include at least one receiver and the transmitting means can include at least one transmitter. The receiver and the transmitter can each be components of different communication devices or electrical devices that include other hardware such as at least one processor connected to a non-transitory computer readable medium (e.g. flash memory, a hard drive, etc.).

According to a preferred embodiment, the system can also include video stream generation device adapted for creating at least one frame comprising synthetically created portions, in particular, comprising a static background and a moving object, the moving object having a position in the frame according to a predefined mathematical equation.

According to another preferred embodiment, the system further comprising, at the receiving means,
a prediction unit adapted to predict the position of the moving object in the frame,
a detection unit adapted to detect the position of the moving object in the frame, and
a quality evaluation unit adapted to evaluate the quality of the video stream received by the receiving means.

The above described embodiments of the inventive method and system may be applied for video conferences and video conference systems. In particular, embodiments of the present invention can provide a test framework for testing video conference systems online during operation, whereby the test system creates a quality score for the transmitted video stream so as to predict the QoE perception of the person who is watching the video. The video test system and method may be applied to a variety of scenarios as, for example, one-to-one end-to-end where the transmitter and receiver are at the client; one-to-many via an intermediate Media Server (MS), e.g., for testing MS performance in conferences; or advance testing (probing) of large conference sessions or detection of suitable network capabilities for video conferencing. The system and method are applicable in real environments from the person's perception watching the video on the basis of a computational video creation.

Other details, objects, and advantages of the invention will become apparent as the following description of certain present preferred embodiments thereof and certain present preferred methods of practicing the same proceeds.

BRIEF DESCRIPTION OF THE DRAWINGS

The invention and embodiments thereof will be described below in further detail in connection with the drawings. It should be understood that like reference numbers used in the drawings may identify like components.

Figure 1:
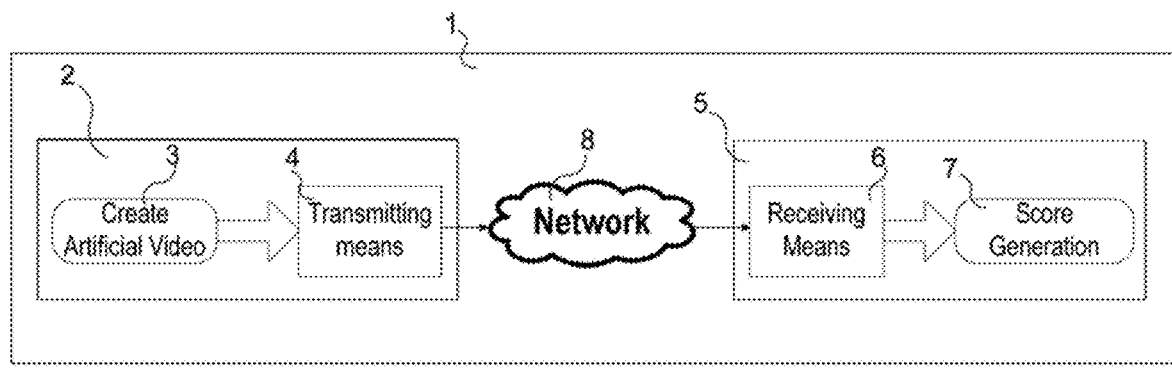
FIG. 1 shows a system for assessing quality of a video transmission according to an embodiment of the invention.

In the drawings, the following reference numerals are utilized for the listed elements shown in the drawings:
1 system for assessing quality of a video transmission
2 transmitting side
3 artificial video stream creation unit
4 transmitting means
5 receiving side
6 receiving means
7 quality score generation unit
8 network
9 Media Server (MS)
10 frame
11 static portion
12 synthetically created portion
13 moving portion
14 path of moving portion
15 frame counter
16 initialization block
17 expected position preditor unit
18 reference object initial position detector unit
19 reference object current position detector unit
20 wave reference generator unit
21 reference object position generator unit
22 waveforms comparator unit
23 score calibration unit

DETAILED DESCRIPTION OF EXEMPLARY EMBODIMENTS

FIG. 1 shows a system 1 for assessing quality of a video transmission according to an embodiment of the invention. This shows a basic configuration of the system 1 comprising, on the transmitting side 2, an artificial video stream creation unit 3 which is adapted to create an artificial video stream comprising a sequence of artificially generated frames, as will be described in further detail with respect to FIG. 3. The artificial video stream creation unit 3 provides, on the transmitting side, an artificially created video stream to a transmitting means 4, for example, a video chat system transmitter, which is connected to a network 8 that may be configured as a communications network.

The transmitter side 2 can be configured as a communication device, a communication terminal, or a communication system. In some embodiments, the transmitting means can be configured as a video chat system transmitter that is a component of a computer device of the transmitter side 2 that includes a processor connected to a non-transitory computer readable medium (e.g. flash memory, a hard drive, etc.). In some embodiments, the computer device of the transmitter side 2 can be configured as a server, a communication device, or a communication terminal. In some embodiments, the artificial video stream creation unit 3 can be incorporated in the computer device. In other embodiments, the artificial video stream creation unit 3 can be included within a separate second computer device having a processor and a non-transitory computer readable medium that is communicatively connectable to a first computer device of the transmitter side that is configured as the transmitting means 4. It should be appreciated that, in some embodiments, the transmitter side 2 can also include peripheral devices (e.g. web cam, input device, output device, input/output device, touch screen display, pointer device, keyboard, etc.) connected to a first computer device and/or a second computer device. The artificial video stream creation unit 3 feeds the artificially created video stream to the transmitting means 4 in replacement of, for example, a webcam (not shown) and functioning, thereby, as a video player. The video stream will then be transmitted via the network 8 in packets and is received at the receiving side 5 by a receiving means 6 of a receiving side 5, as for example, a video chat system receiver of the receiving side 5.

The receiving side 5 can be configured as a communication device, a communication terminal, or a system in some embodiments. The video chat system receiver can be a component of a computer device of the receiving side that includes a processor connected to a non-transitory computer readable medium (e.g. flash memory, a hard drive, etc.). One or more peripheral device can be connected to the compute device as well (e.g. a web cam, a keyboard, a touch screen display, a pointer device, an input device, an output device, an input/output device, etc.).

The receiving means 6 can be configured to prepare the received video stream for being displayed. However, instead of sending the thus prepared video stream to a display for being displayed, it forwards it to a quality score generation unit 7 on the receiving side 5, which analyzes the received video stream with respect to transmission quality and generates a quality score on the transmission quality as output. It should be appreciated that the quality score generation unit 7 can be a component of a first computer device of the receiving side 5 that also includes the receiving means 6 or can be included in a separate second computer device communicatively connected to the computer device of the receiving side that has the receiving means 6.

Figure 2:
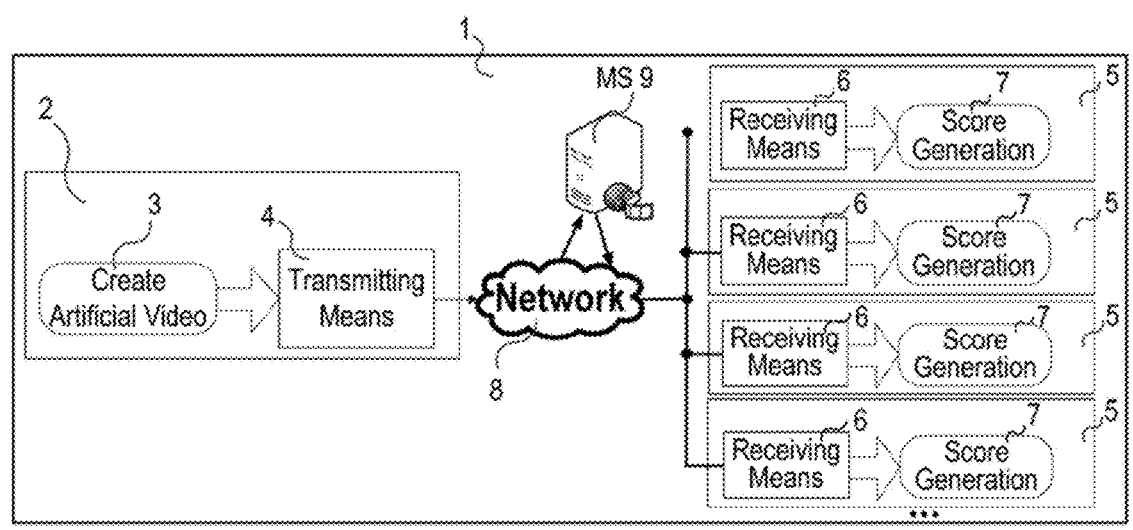
FIG. 2 shows a system for assessing quality of a video transmission according to another embodiment of the invention.

FIG. 2 shows a system 1 for assessing quality of a video transmission according to another embodiment of the invention that includes a Media Server (MS) 9, which can be used, for example, for a broadcast video transmission, like an all-hands-meeting. As can be seen here, a video stream created artificially by the artificial video stream creation unit 3 on the transmitting side 2, here, is transmitted by the transmitting means 4 via the network 8 to the MS 9 instead of being transmitted to the receiving side 5 directly. The MS 9 broadcasts the video stream received from the transmitting means 4 to a plurality of receiving means 6 on the receiving side 5. Each receiving means 6 can be a component of a respective computer device that includes a score generation unit 7 or is communicatively connected to a respective computer device that includes the score generation unit 8.

Every receiving means 6 for each receiving side 5 prepares the video stream received from the MS 9 for being displayed, as outlined above. But, instead of sending the thus prepared video stream to a display unit, every receiving means 6 respectively forwards the thus prepared video stream to a respective quality score generation unit 7 for being analyzed with respect to the transmission quality and for generating a quality score on the transmission quality as output. In this embodiment, the test focus is on the MS 9 which is responsible for broadcasting the video stream.

Figure 3:
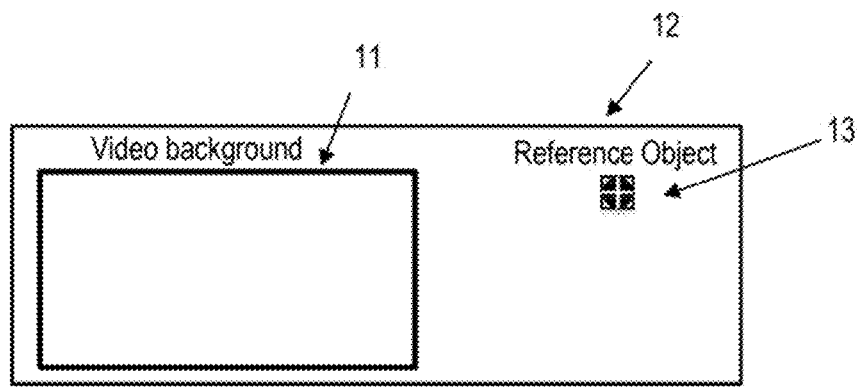
FIG. 3 shows an example of an artificially created frame of a video stream according to an embodiment of the invention.

FIG. 3 schematically shows an example of an artificially created frame of a video stream according to an embodiment of the invention. As already described above, the transmitting means 3 (see FIG. 1 and FIG. 2) creates an artificial video. The artificial video is created mathematically "on-the-fly" during transmission and its output simulates video capture devices so as to generate the input for the system to be tested. The artificial video stream to be transmitted comprises a sequence of frames 10. Each frame 10 can include synthetically created portions 12 composed of a static portion 11 as a static video background which is defined mathematically or by an image reference and which will remain unchanged over the sequence of frames 10. Each frame 10 can also include at least one moving portion 13, which preferably is a known image, and further preferably is substantially smaller than the static portion 11 or the entire video frame size. This moving portion 13 preferably is a moving object, here, also referred to as reference object.

The artificially created video stream can consist of or include a predetermined sequence of frames 10 which is then transmitted to the receiving side 5 can be formed as follows (in some embodiments):
the static portion 11 will remain unchanged over all video frames 10 in the sequence of video frames 10; and
the moving portion 13 or reference object will have its position changed from frame to frame within the sequence of frames 10 where the position change follows a mathematical equation according to which the input for the equation is the frame number and the output of the equation is the horizontal and vertical position (x, y) of the moving portion 13:

$$\text{Position}(x,y)=[\text{equation1(frame number)},\text{equation 2(frame number)}]$$

Figure 4:
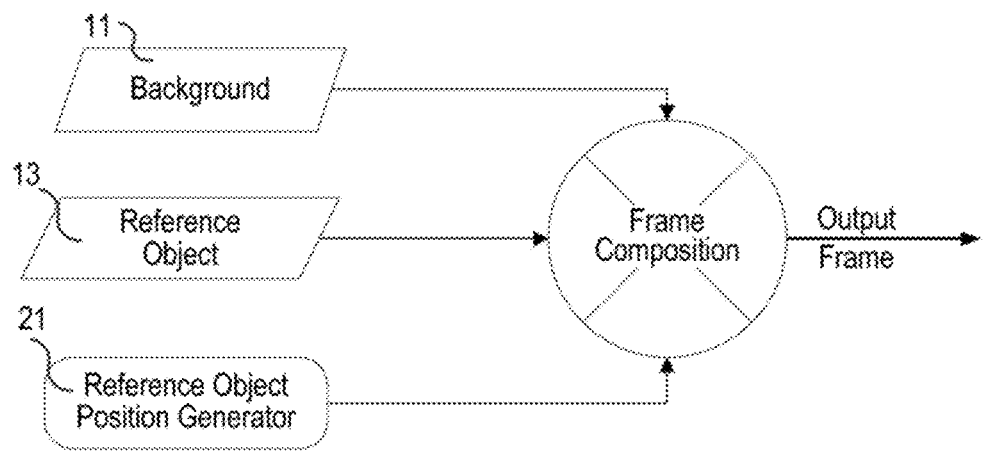
FIG. 4 schematically shows the exemplary procedure for creating a frame shown in FIG. 3 for transmission.

FIG. 4 schematically shows an embodiment of the procedure for creating a frame 10, as shown in FIG. 3, for transmission to a receiving means 6 on the receiving side 5 (see FIG. 1, FIG. 2). As can be seen, the frame composition consists of the static background or static portion 11 and the reference object or moving portion 13, the position of which is defined by a mathematical equation by the Reference Object Position Generator 21. The thus composed frame 10 is output to the receiving side 5 (FIG. 1) directly, or indirectly via a MS 9 (see FIG. 2).

Figure 5:
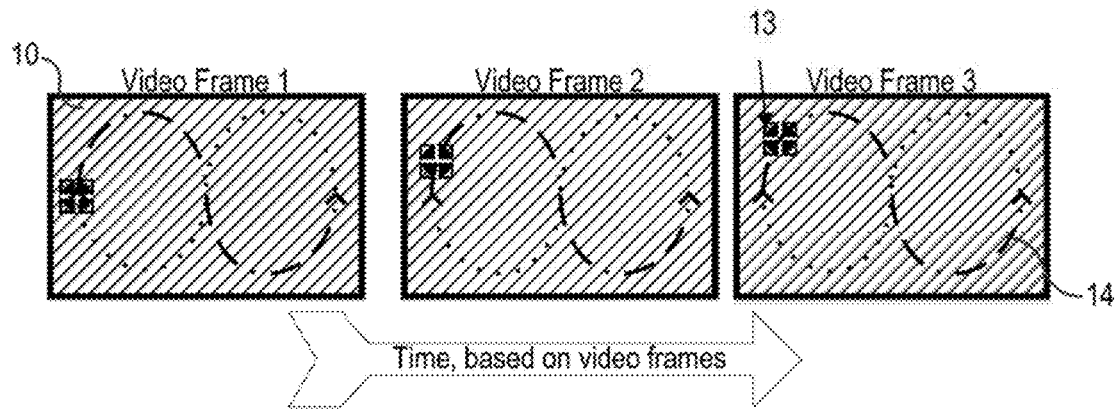
FIG. 5 shows an example for a mathematically created path of a moving object.

FIG. 5 illustrates an exemplary movement of a moving portion 13 along a sequence of frames 10 in an artificially created video stream which then is transmitted to a receiving means 6 on the receiving side 5, as explained above. Here, the mathematically created path 14 of the moving object (e.g. a type of moving portion 13) follows a sine curve as indicated by the broken line. As can be seen, in the first video frame 10 in the sequence of video frames, the moving object has an initial or first position with respect to x-y coordinates. In the second video frame 10 which follows the first video frame 10 in the sequence of video frames of the artificial video stream, the moving object has moved slightly upwards on the sine curve which represents the moving path 14 to be followed in the test sequence. Then, in a third video frame 10, the moving object of the moving portion 13 has moved even further upwards on the sine curve, and so on. In every subsequent frame 10 of the sequence, which is not further illustrated here, the moving object will move to a further predetermined position on the mathematically created moving path 14.

As already outlined above, the thus created sequence of video frames 10 forming the artificial video stream is then transmitted to the receiving side 5, where a receiving means 6 prepares the received data which may comprise an error or which may be correct (in particular, regarding the expected or predicted x-y-position of the moving object of the moving portion 13 from frame to frame according to the mathematically created path) for being presented to a watcher (e.g. a user of the computer device of the receiving means 6). However, instead of presenting the thus prepared video stream on a display communicatively connected to the receiving means 6 or the computer device of the receiving means 6, it is provided to the quality score generation unit 7 so as to evaluate the quality of transmission.

Figure 6:
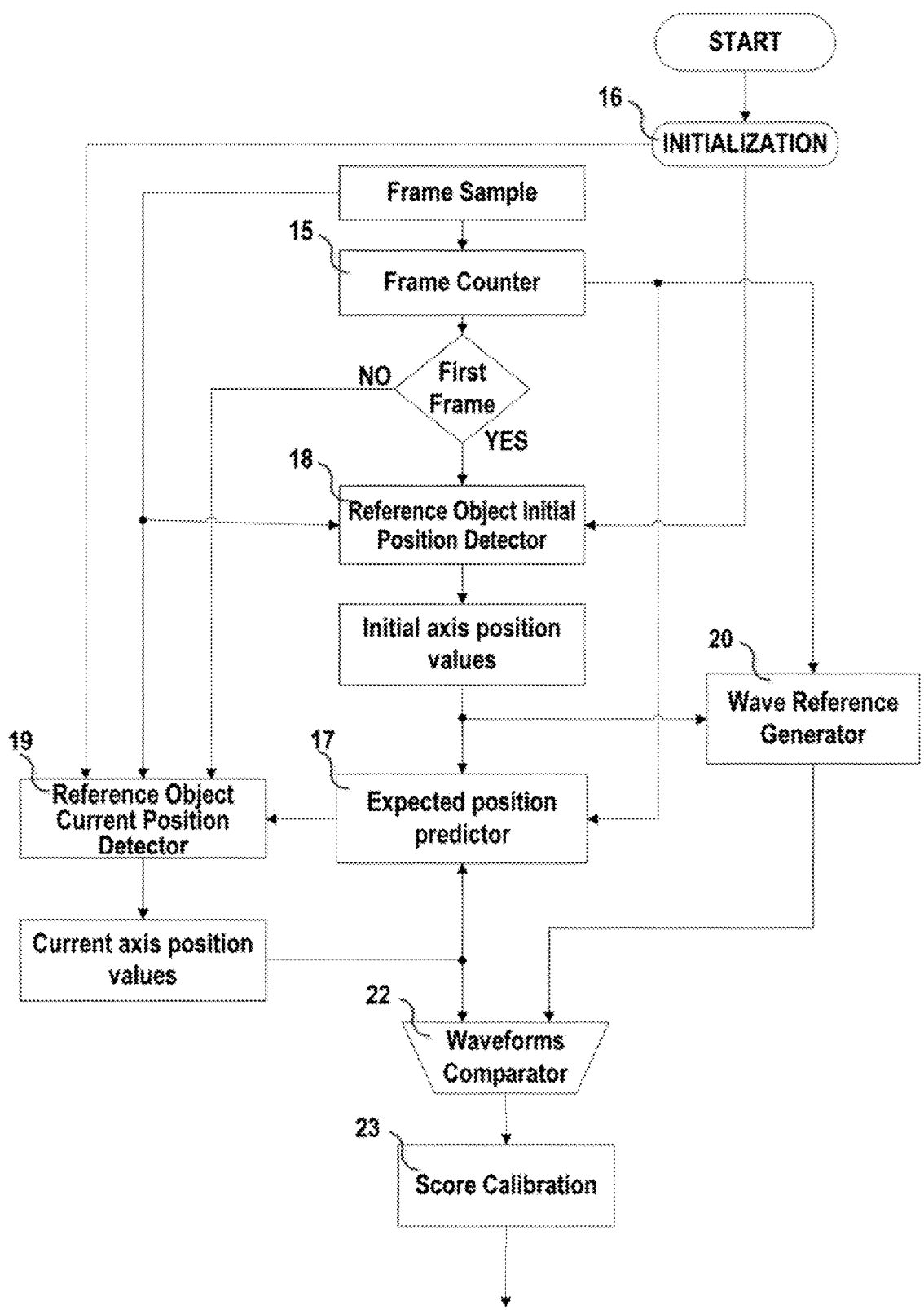
FIG. 6 shows a configuration of the receiving side according to an embodiment of the invention.

FIG. 6 shows a flow chart for a configuration of the receiving side 5, in particular, of the quality score generation unit 7, according to an embodiment of the invention, which comprises a frame counter 15 for counting the frames so as to determine the frame number of the frame received in the sequence of frames comprised in the artificial video stream, an initialization block 16, an expected position predictor unit 17 for determining an expected position of the moving object or reference object for the next frame received in the sequence of frames of the artificial video stream is provided, a reference object initial position detector unit 18 for detecting the moving object over the entire video frame, a reference object current position detector unit 19 for detecting the moving object only in an area already defined by the expected position predictor unit 17, a wave reference generator unit 20, a waveform comparator unit 22, and a score calibration unit 23.

The procedure illustrated by FIG. 6 is summarized below. When the process starts, the initialization block 16 will run just once in order to make a pre-process in the reference object (e.g. a moving object of a moving portion 13) in order to improve further processing. Then, after that, the entire process is driven by the input of video frames to the algorithm.

The first procedure to be done is the counting of the input frames by the frame counter 15. The counting of input frames is needed because it must be used as "clock" for the entire procedure. The result of the frame counter 15 will be used as input to the wave reference generator unit 20 and expected position predictor unit 17. The frame counter 15 output will be also used in order to discover if the input frame is the first frame or not. If the input frame is the first one it must have a special process.

When the first frame arrives, the score generation unit 7 (see FIG. 2) is not able yet to know where the position of the moving object or reference is expected to be, then, in order to know where it is located, it must proceed by checking the entire frame looking for the position of the moving object or reference object. This procedure of looking for the moving object or reference object through the entire frame is done by the reference object initial position detector unit 18, which will generate as output the initial axis, vertical and horizontal positions values that will be used as input by the wave reference generator unit 20 and the expected position predictor unit 17. The reference object initial position detector unit 18 can run just for the first frame.

The wave reference generator unit 20 will calculate the position of the moving object or reference object of the moving portion 13 for each frame, using as input the initial position of the moving object or reference object in the first frame and the frame number coming from the frame counter 15. The equation used in the wave reference generator unit 20 can be the same as the one used in the reference object position generator unit 21 from the artificial video stream creation unit 3, shown in FIG. 4.

The output of the wave reference generator unit 20 will be the vertical and horizontal position of the moving object or reference object for the given frame. It will represent the movement waveform that is generated if no quality issue happens during transmission. This output will be used by the waveforms comparator block 22 in order to have a reference of how should be a perfect wave if no quality issue is found in the transmitted video.

The expected position predictor unit 17 will use the input from the reference object initial position detector unit 18 just for initialization purposes, when the first frame arrives. For all the other frames after the first one, the position predictor unit 17 will use the input coming from the reference object current position detector unit 19. It must be so because the input from reference object current position detector unit 19 is not available for the first frame, but it is available for all the other frames. The output from frame counter 15 will also be used by the expected position predictor unit 17 in order to be aware of which frame it is predicting the position of the moving object or reference object.

The expected position predictor unit 17 can use the same equation used by the wave reference generator unit 20 and reference object position generator unit 21 in order to predict the expected position of the moving object or reference object of the moving portion 13 in the next frame. It will have as output the position, vertical and horizontal axis values, of the expected position of the moving object or reference object for the next frame. This output will be used by the reference object current position detector unit 19.

When the next frames other than the first one arrive, the reference object current position detector unit 19 becomes active. It must try to find the moving object or reference object of the moving portion 13 around the position that was predicted by the expected position predictor unit 17. The output of the reference object current position detector unit 19 will be used by the Waveforms comparators unit 22 in order to compare the other mentioned input that represents a waveform of a moving object without any distortion to the actual transmitted one.

The output of the reference object current position detector unit 19 will be used also as input of the expected position predictor unit 17 since it will need this information in order to predict where to look for the moving object or reference object of the moving portion 13 in the next frame.

The waveforms comparator unit 22 can make a simple comparison of all incoming waveforms, here, the ones coming from the reference object current position detector unit 19 and the wave reference generator unit 20. Comparing these waveforms by a Pearson correlation method it is possible to know how much the transmitted waveforms follows the reference waveforms. The output of the waveforms comparator unit 22 must be processed by the score calibration unit 23 in order to put all waveforms comparison results together in one single score. In an optional embodiment, the score calibration unit 23 will not just create a final score for the quality result, but it may also generate events each time that the synchronization among the waveforms are lost, which indicates that at this specific time a quality issue has happened. The score calibration unit 23 may also generate a vector listing all the frames where a quality result was identified, together with the final score quality result.

Figure 7:
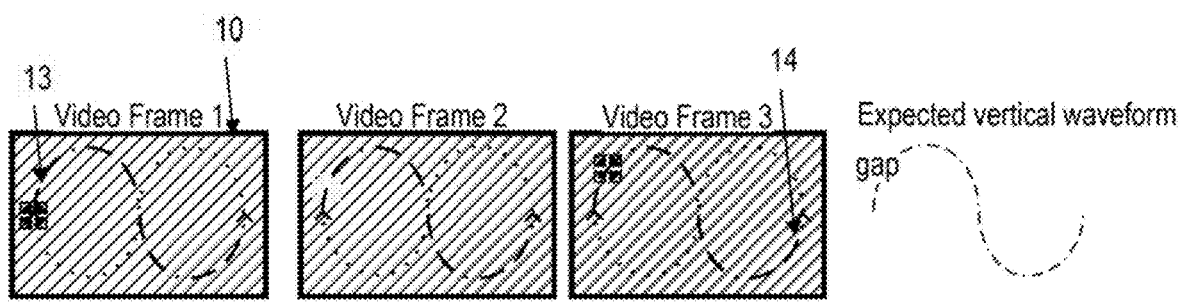
FIG. 7 shows a diagram illustrating the detection of a degraded video stream transmission.

FIG. 7 shows a diagram illustrating an exemplary detection of a degraded video stream transmission, which has been received at the receiving side 5 and which has been analyzed as outlined above. Here, it can be seen that in the second video frame ("Video Frame 2"), the moving object of the moving portion 13 cannot be seen at all, and thus, cannot be detected, which is the result of the CODEC compression having been changed. In this case, the degradation of the video stream received has been considered as being severe, causing a quality issue for the watcher.

Figure 8:
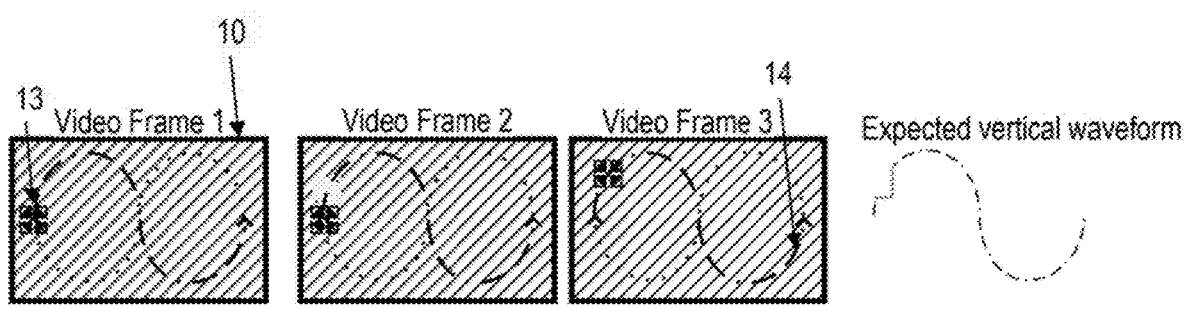
FIG. 8 shows another diagram illustrating the detection of a degraded video stream transmission.

FIG. 8 shows another diagram illustrating the detection of a degraded video stream transmission. Here, it can be seen that the moving object of the moving portion 13 in the second frame of the video stream received at the receiving side 5 has not moved as it should have from the first video frame ("Video Frame 1) to the second video frame ("Video Frame 2"), and still is detected at the position it had in the first frame. This is due to packet loss in the network; the user will perceive this sequence of the received video stream as a frozen image. As a consequence, the quality score generation unit 7 (see FIG. 1, FIG. 2) will reduce the score quality result so as to be able to prevent such an event.

In both FIG. 7 and FIG. 8, only the result of the vertical waveform has been illustrated on the right hand side of the figures, respectively. For the analysis, as described above, in particular, in respect of FIG. 6, also the horizontal waveform result can be taken into consideration. In both examples shown in FIG. 7 and FIG. 8, the resulting sinusoidal waveform will be compared to a perfect sinusoidal waveform and the differences among them will reflect the final quality result.

Further, it is noted that if the reference or moving object and the static object or background both are created mathematically, there does not have to be any data exchange in this respect between the receiving side 5 and the transmitting side 2, since there is no further information needed at the receiving side 5 except for the mathematical equation which defines the moving path of the moving object or reference object.

However, if the static portion 11 (background) and/or the moving portion 13 or moving object are based on a pre-defined image, the receiving means 6 will need information on this pre-defined image or images.

Moreover, it is also noted that the mathematical equation defining the moving path 14 of the moving object or moving portion serving as a reference object always has to be known to the receiving side 5, namely, the receiving means 6, and the transmitting side 2, namely, the transmitting means 4. But, the starting time of the transmitted video stream does not need to be known to the receiving side 5, namely, the receiving means 6, since the latter will use the received video stream itself for performing video frame synchronization.

Finally, it is noted that any change during the video stream transmission will show an effect at the receiving side 5 at the receiving means 6. Changes made by CODEC compression, CODEC decompression, dimensioning, etc. will affect the video stream received and embodiments of the method and system described above will enable the detection of it and its evaluation as to quality of the video transmission. Thus, artifacts like packet recording, packet loss, delay, and the like will be detected and evaluated as to transmission quality of the video stream, which can permit proactive resolution of such issues.

It should be appreciated that different changes can be made to embodiments of the method, communication apparatus, and system to meet different sets of design criteria. For instance, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a system, a communication apparatus, and methods of making and using the same have been shown and described above, it is to be distinctly understood that the invention is not limited thereto but may be otherwise variously embodied and practiced within the scope of the following claims.

What is claimed is:

1. A method for assessing quality of a video transmission over a network between a transmitting side and a receiving side, the transmitting side comprising a processor connected to a non-transitory computer readable medium, the method comprising:

receiving, at the receiving side, a video stream generated at the transmitting side and transmitted via the network to the receiving side, the receiving side comprising a processor connected to a non-transitory computer readable medium, the video stream received from the transmitting side comprising a plurality of frames, a reference object being within each of the frames, the frames of the video stream received from the transmitting side comprising at least one moving portion and a static portion, the at least one moving portion comprising the reference object, the reference object being a moving object that moves along a pre-selected path of motion in the video stream generated by the transmitting side that is received at the receiver side via the network;

analyzing, at the receiving side, the video stream received from the transmitting side by comparing the video stream received from the transmitting side via the network with a reference movement waveform for the video stream predicting different positions of the reference object for the frames of the video stream along the pre-selected path of motion, the pre-selected path of motion being defined by a mathematical equation, the mathematical equation being known to the receiving side for generation of the reference movement waveform, generating, at the receiving side, a quality score for the video stream received from the transmitting side via the network based on a comparison of positions of the reference object in the frames of the video stream received from the transmitting side and the different positions of the reference object predicted by the reference movement waveform, and outputting, at the receiving side, the quality score for the video stream received from the transmitting side for detection of degradation of the video stream received from the transmitting side via the network due to quality of video transmission issues to predict a quality of experience (QoE) for the video stream received from the transmitting side via the network so that a proactive correction action is takeable to address QoE issues when the QoE is below a pre-selected threshold.

2. The method of claim 1, wherein the frames of the video stream received from the transmitting side include synthetically created portions, the synthetically created portions comprising the at least one moving portion and the static portion.

3. The method according to claim 2, wherein the static portion comprises a static background or a predefined image, the static portion remaining unchanged in each frame of the plurality of frames of the video stream.

4. The method of claim 3, wherein the moving object changes position from frame to frame along a-sequence of frames of the video stream transmitted by the transmitting side via the network as defined by the mathematical equation.

5. The method of claim 4, wherein the synthetically created portions of the video stream received from the transmitting side are known at the receiving side via the mathematical equation according to which the moving object changes its position along the sequence of frames such that changes of position of the moving object is known at the receiving side via the mathematical equation for generation of the reference movement waveform.

6. The method of claim 5, wherein the at least one moving portion is smaller than the static portion.

7. The method of claim 6, comprising:
generating the synthetically created portions of the video stream by the transmitting side during transmission of the video stream.

8. The method of claim 7, comprising:
preparing the video stream for being displayed at the receiving side via a display.

9. The method of claim 8, wherein the analyzing of the video stream received from the transmitting side is carried out after the video stream is prepared for being displayed.

10. The method of claim 9, comprising:
displaying the video stream received from the transmitting side at the receiving side, wherein the analyzing the video stream is carried out prior to the displaying of the video stream received from the transmitting side.

11. The method of claim 10, wherein an input for the mathematical equation is a frame number of a frame of the frames of the video stream received from the transmitting side, and wherein an output of the mathematical equation is a horizontal position and a vertical position of the moving object.

12. The method of claim 11, wherein the video stream is received at the receiving side from the transmitting side via a media server, the media server comprising a processor connected to a non-transitory computer readable medium.

13. A system for assessing quality of a video transmission over a network between a transmitting side and a receiving side, the system comprising:
a transmitting side computer device including a transmitting device at the transmitting side;
a receiving side computer device including a receiving device at the receiving side;
the transmitting side computer device connected to the receiving side computer device via the network;
the receiving side computer device configured to receive a video stream generated at the transmitting side and transmitted via the network to the receiving side, the video stream comprising a plurality of frames, a reference object being within each of the frames, the frames of the video stream comprising at least one moving portion and a static portion, the at least one moving portion comprising the reference object, the reference object being a moving object that moves along a pre-selected path of motion in the video stream;
the receiving side computer device configured to analyze the video stream by comparing the video stream with a reference movement waveform for the video stream predicting different positions of the reference object for the frames of the video stream along the pre-selected path of motion, the pre-selected path of motion being defined by a mathematical equation, the mathematical equation being known to the receiving side computer device for generation of the reference movement waveform,
the receiving side computer device configured to generate a quality score for the video stream based on a comparison of positions of the reference object in the frames of the video stream with the different positions of the reference object predicted via the reference movement waveform, and
the receiving side computer device configured to output the quality score for the video stream for detection of degradation of the video stream due to quality of video transmission issues to predict a quality of experience (QoE) for the video stream so that a proactive correction action is takeable to address QoE issues when the QoE is below a pre-selected threshold.

14. The system of claim 13, wherein the transmitting side includes an artificial video stream creation unit configured to create synthetically created portions of the frames of the video stream, the synthetically created portions comprising the static portion, the static portion comprising a static background, the synthetically created portions also including the moving object.

15. The system of claim 14, wherein the receiving side computer device includes:
a prediction unit to predict the positions of the moving object in the frames of the video stream;
a detection unit to detect the position of the moving object in each of the frames of the video stream; and
a quality score generation unit to generate the quality score.

16. A communication apparatus for assessing quality of a video transmission comprising:
a receiving side computer device including a receiving device having a processor connected to a non-transitory computer readable medium;
the receiving side computer device configured to receive a video stream generated at a transmitting side and transmitted to the receiving side computer device via a network, the video stream comprising a plurality of frames, a reference object being within each of the frames, the frames of the video stream comprising at least one moving portion and a static portion, the at least one moving portion comprising the reference object, the reference object being a moving object that moves along a pre-selected path of motion in the video stream;
the receiving side computer device configured to analyze the video stream by comparing the video stream with a reference movement waveform for the video stream predicting different positions of the reference object for the frames of the video stream along the pre-selected path of motion, the pre-selected path of motion being defined by a mathematical equation, the mathematical equation being known to the receiving side computer device for generation of the reference movement waveform, the receiving side computer device configured to generate a quality score for the video stream based on a comparison of positions of the reference object in the frames of the video stream with the different positions of the reference object in the comparison frames, and the receiving side computer device configured to output the quality score for the video stream for detection of degradation of the video stream due to quality of video transmission issues to predict a quality of experience (QoE) for the video stream so that a proactive correction action is takeable to address QoE issues when the QoE is below a pre-selected threshold.

17. The communication apparatus of claim 16, wherein the receiving side computer device has a display or is communicatively connectable to a display.

18. The communication apparatus of claim 16, wherein the reference movement waveform is generated via a wave reference generator.

19. The communication apparatus of claim 16, wherein the reference movement waveform is generated by the receiving side computer device.

* * * * *